United States Patent [19]
Lin

[11] Patent Number: 6,019,017
[45] Date of Patent: Feb. 1, 2000

[54] UPPER HEADSET ASSEMBLY FOR A BICYCLE

[76] Inventor: King-Chen Lin, No. 85, Chiang-Shan Rd., Chiang-Shan Village, Ta-Liao Hsiang, Kaohsiung Hsien, Taiwan

[21] Appl. No.: 09/270,204

[22] Filed: Mar. 15, 1999

[51] Int. Cl.[7] .................................................. B62K 21/06
[52] U.S. Cl. .......................... 74/551.1; 384/545; 384/538
[58] Field of Search .......................... 74/551.1; 384/545, 384/538, 541; 280/279

[56] References Cited

U.S. PATENT DOCUMENTS 5,267,485  12/1993  Chi ........................................ 74/551.1
5,544,905  8/1996  Chen ................................. 74/551.1 X

*Primary Examiner*—Mary Ann Battista
*Attorney, Agent, or Firm*—Rosenberg, Klein & Lee

[57] ABSTRACT

An upper headset assembly for a bicycle includes a race member having an annular groove defined in the top thereof for receiving a bearing therein. A ring member is mounted to the bearing on the outer periphery thereof and has a first tapered surface defined in the inner periphery thereof. A pressing ring device has a second tapered surface contacting the first tapered surface of the ring member and a third tapered surface. A collar is mounted to the pressing ring device and a plurality of bolts extend through the collar and contact against the third tapered surface.

5 Claims, 4 Drawing Sheets

UPPER HEADSET ASSEMBLY FOR A BICYCLE

FIELD OF THE INVENTION

The present invention relates to a headset assembly for a bicycle, and more particularly, to an upper headset assembly for a bicycle which is pressed by a handlebar stem and employs bolts inclinedly to extend through a top cap to contact against the pressing ring to secure the position of the bearing.

BACKGROUND OF THE INVENTION

A bicycle front fork includes a fork stem extending through the head tube of a bicycle frame with a lower headset assembly connected between the lower end of the head tube and the root portion of the fork stem and an upper headset assembly connected between the upper end of the head tube and the fork stem so that the fork stem is independently rotatable relative to the head tube. The handlebar stem is securely mounted to the fork stem so that when turning the handlebar, the front wheel between the two extensions of the front fork turns while the bicycle frame is maintained. Many headset assemblies are developed to perform the features mentioned above such as European Patent 0 541 070A1 with the title of "apparatus for rotatably fitting a fork stem in a head tube of a bicycle" to Nagano, Masashi, U.S. Pat. No. 5,163,758 with the title of "journal for a head tube of a bicycle" to Chi and U.S. Pat. No. 5,095,770 having the title of "steering bearing assembly for wheeled vehicle" to Rader. The former one of the two prior patents involves a complicated structure and are used for the fork stem having threaded outer surface, and the latter one although has a simple structure and is used for the fork stem having a smooth outer surface, the position relationship between the parts of the upper headset assembly is not firmly engaged with each other so that if the bicycle is incurred a big impact, such the structural arrangement could displace.

The present invention intends to provide an upper headset assembly having bolts extending through the top cap and contacting against the pressing ring to securely position the bearing and the parts of the upper headset assembly.

SUMMARY OF THE INVENTION

In accordance with one aspect of the present invention, there is provided an upper headset assembly for a bicycle, comprising a race member having a neck inserted between the head tube and the fork stem, and an annular groove defined in the top thereof for receiving a bearing therein. A ring member is mounted to the bearing on the outer periphery thereof and has a first tapered surface defined in the inner periphery thereof. A pressing ring means has a second tapered surface contacting the first tapered surface of the ring member and a third tapered surface defined in the outer periphery thereof. A collar is mounted to the pressing ring means and has a plurality of bolts extending therethrough so as to apply a force to the pressing ring means to press the ring member onto the bearing.

The object of the present invention is to provide an upper headset assembly which uses bolts to apply a force to securely position the bearing.

Further objects, advantages, and features of the present invention will become apparent from the following detailed description with appropriate reference to the accompanying drawings.

DETAILED DESCRIPTION OF THE PREFERRED EMBODIMENT

Figure 1:
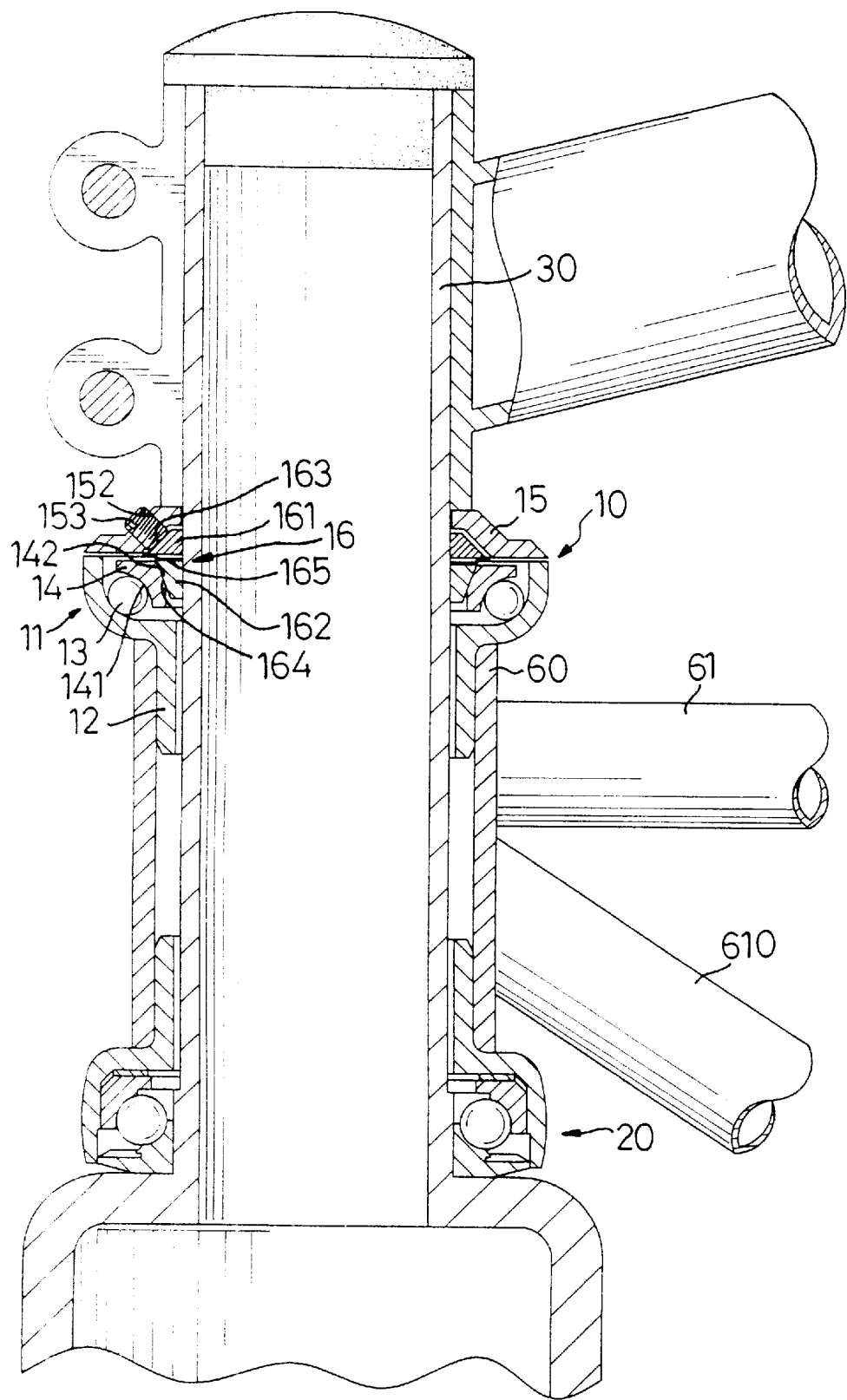
FIG. 1 is a side elevational view, partly in section, of the assembly of the fork stem extending through the head tube with the lower headset assembly and the upper headset assembly in accordance with the present invention mounted to the two ends of the head tube.
Figure 2:
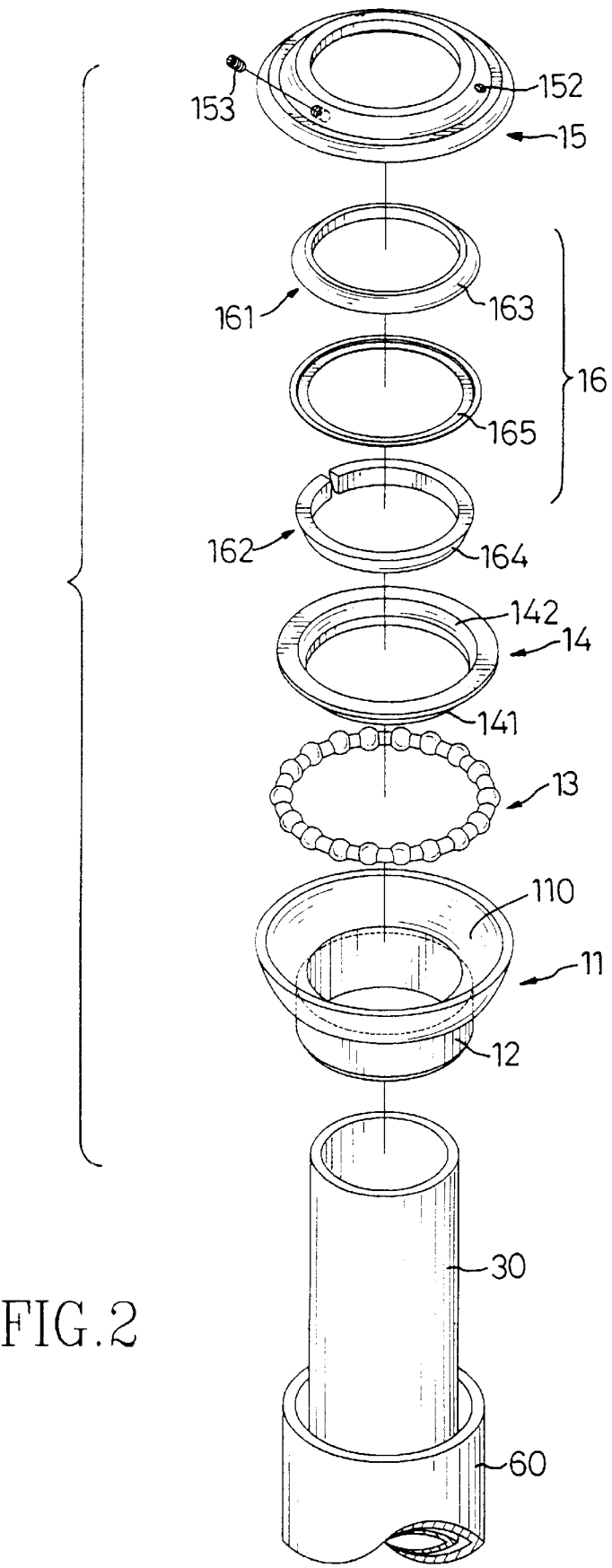
FIG. 2 is an exploded view of the upper headset assembly in accordance with the present invention.
Figure 3:
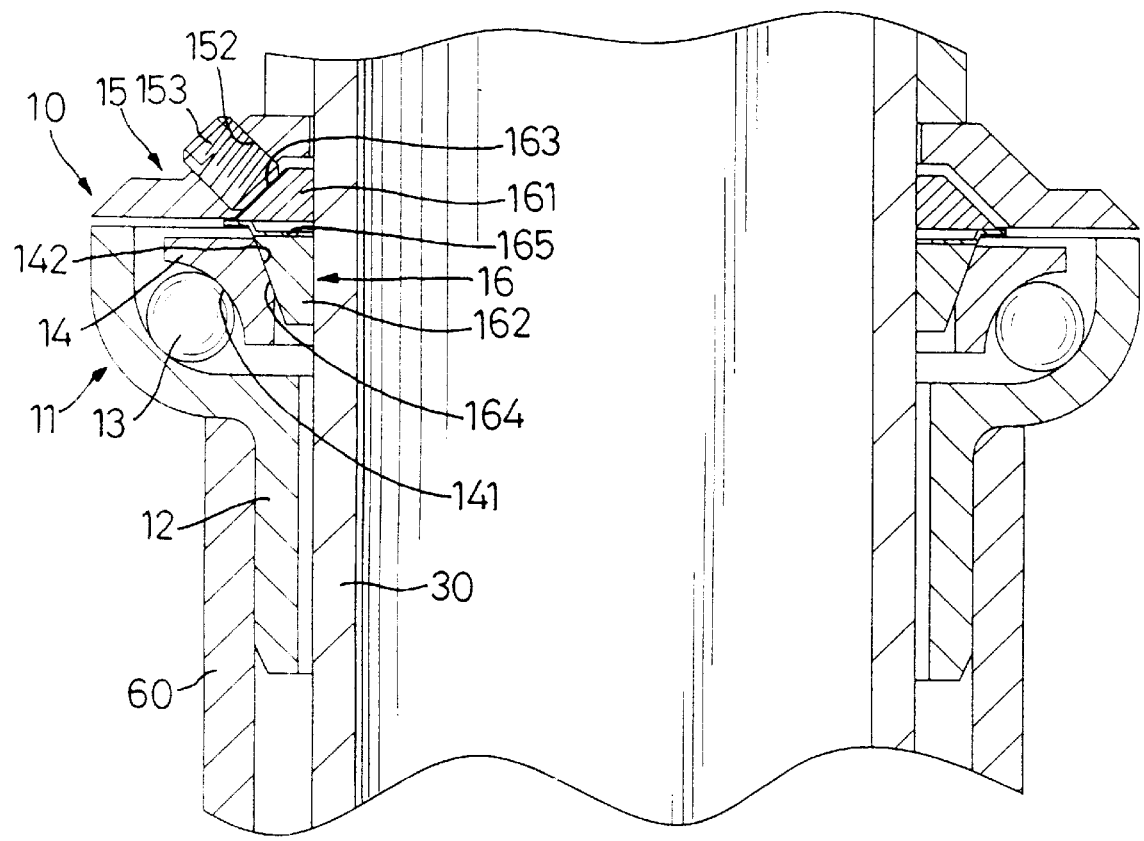
FIG. 3 is an enlarged cross-sectional to show the upper headset assembly of the in accordance with the present invention.

Referring to FIGS. 1 to 3, a bicycle generally has a frame including a top tube (61) and a downward tube (610) and a head tube (60) connected to both of the top tube (61) and the downward tube (610). A fork stem (30) extends through the head tube (60) and a lower headset assembly (20) is connected between the lower end of the head tube (60) and the fork stem (30), and the upper headset assembly (10) in accordance with the present invention is connected between the upper end of the head tube (60) and the fork stem (30) so that the fork stem (30) is rotatable regardless of the head tube (60).

The upper headset assembly in accordance with the present invention comprises a race member (11) having a neck (12) inserted between the head tube (60) and the fork stem (30), and an annular groove (110) defined in the enlarged top of the race member (11) for a bearing (13) being received therein. The bearing (13) is positioned by a ring member (14) mounted to the bearing (13) on a curved groove (141) defined in the outer periphery thereof. The ring member (14) has a first tapered surface (142) defined in the inner periphery thereof.

A pressing ring means (16) is mounted to the fork stem (30) and includes a first ring (161) having a third tapered surface (163) defined in the outer periphery thereof, a C-shaped second ring (162) having a second tapered surface (164) defined in the outer periphery thereof and a biasing ring (165) biasedly clamped between the first ring (161) and the second ring (162). The second tapered surface (164) contacts the first tapered surface (142) of the ring member (14).

Figure 4:
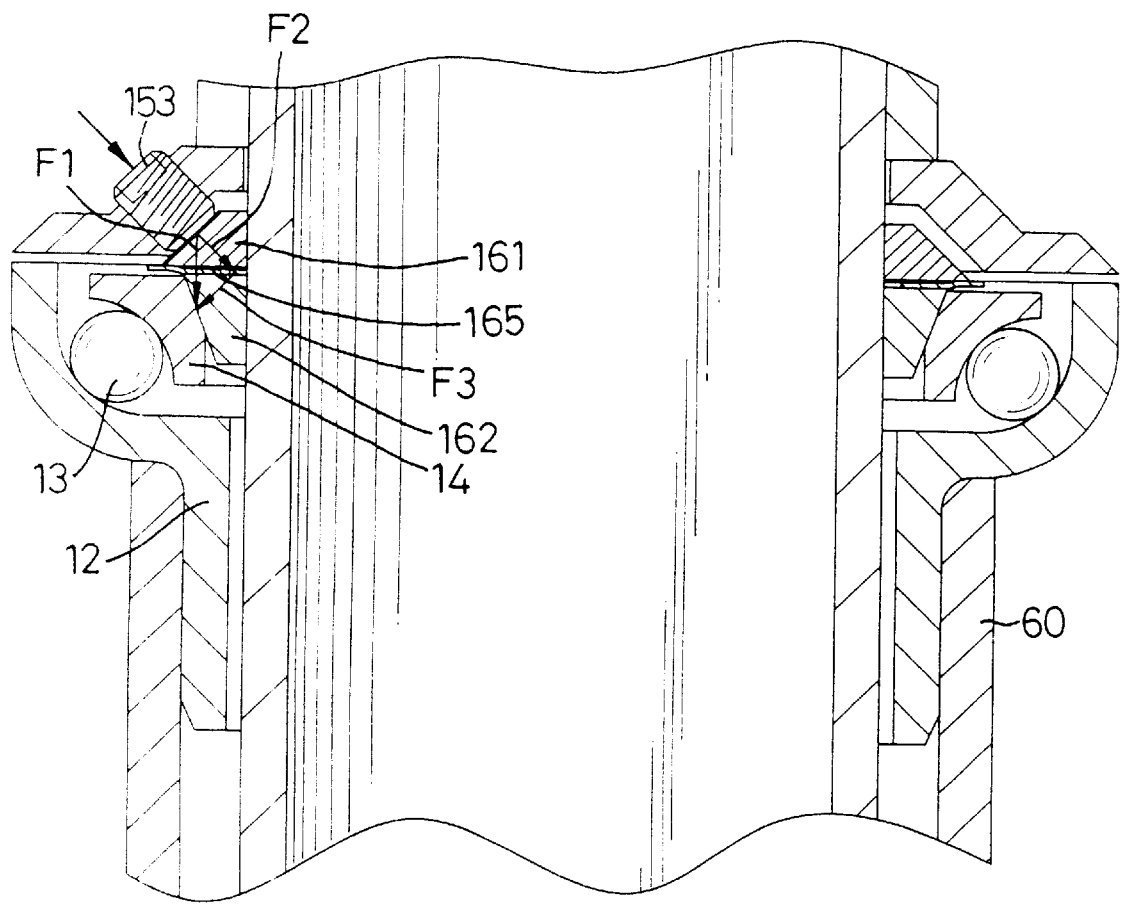
FIG. 4 is a view similar to that shown in FIG. 3 and illustrating the directions of the force applied by the bolt.

A collar (15) is mounted to the fork stem (30) and has a plurality of holes (152) defined inclinedly relative to an axis of the collar (15). Each of the holes (152) has a bolt (153) extending therethrough and applies a force to the pressing ring means (16). Referring to FIG. 4, each of the bolts (153) contacts against the third tapered surface (163) so as to apply a force perpendicularly to the third tapered surface (163). It is to be noted that the force applied to the first ring (161) produces a downward force F1 to the second ring (162) and the downward force F1 is the sum of a force F2 and a force F3 perpendicularly applied to the first tapered surface (142) to push the ring member (14) to press on the bearing (13). Also, the reaction force from the ring member (14) will push the second ring (162) to securely mount to the fork stem (30). The biasing ring compensates the clearance possibly defined between the second ring (162) and the ring member (14), and/or the clearance possibly defined between the second ring (162) and the first ring (161).

Although the invention has been explained in relation to its preferred embodiment, it is to be understood that many other possible modifications and variations can be made without departing from the spirit and scope of the invention as hereinafter claimed.

What is claimed is:

1. An upper headset assembly for a bicycle which has a head tube (60) with a fork stem (30) extending through the head tube (60), a lower headset assembly (20) connected between the lower end of the head tube (60) and the fork stem (30), said upper headset assembly (10) connected between the upper end of the head tube (60) and the fork stem (30), said upper headset assembly comprising:

a race member (11) having a neck (12) adapted to insert between the head tube (60) and the fork stem (30), and an annular groove (110) defined in the top of said race member (11) for a bearing (13) being received therein, a ring member (14) mounted to said bearing (13) on the outer periphery thereof and having a first tapered surface (142) defined in the inner periphery thereof;

a pressing ring means (16) having a second tapered surface (164) and a third tapered surface (163), said second tapered surface (164) contacting said first tapered surface (142) of said ring member (14), and a collar (15) mounted to said pressing ring means (16) and having a plurality of holes (152) defined therethrough, each of said holes (152) having a bolt (153) extending therethrough and applying a force to said pressing ring means (16) to press said ring member (14) onto said bearing (13), wherein said pressing ring means (16) includes a first ring (161) having said third tapered surface (163) defined in the outer periphery thereof, a second ring (162) having said second tapered surface (164) defined in said outer periphery thereof and a biasing ring (165) biasedly clamped between said first ring (161) and said second ring (162).

2. The upper headset assembly as claimed in claim 1, wherein said second ring (162) is a C-shaped member.

3. The upper headset assembly as claimed in claim 1, wherein each of said holes (152) extends inclinedly relative to an axis of said collar (15).

4. The upper headset assembly as claimed in claim 1, wherein each of said bolts (153) contacts against said third tapered surface (163).

5. The upper headset assembly as claimed in claim 1, wherein each of said bolts (153) applies a force perpendicularly to said third tapered surface (163).

* * * * *